May 6, 1947.  W. E. HUNT  2,420,174
ROTARY WING STRUCTURE
Filed Oct. 31, 1942
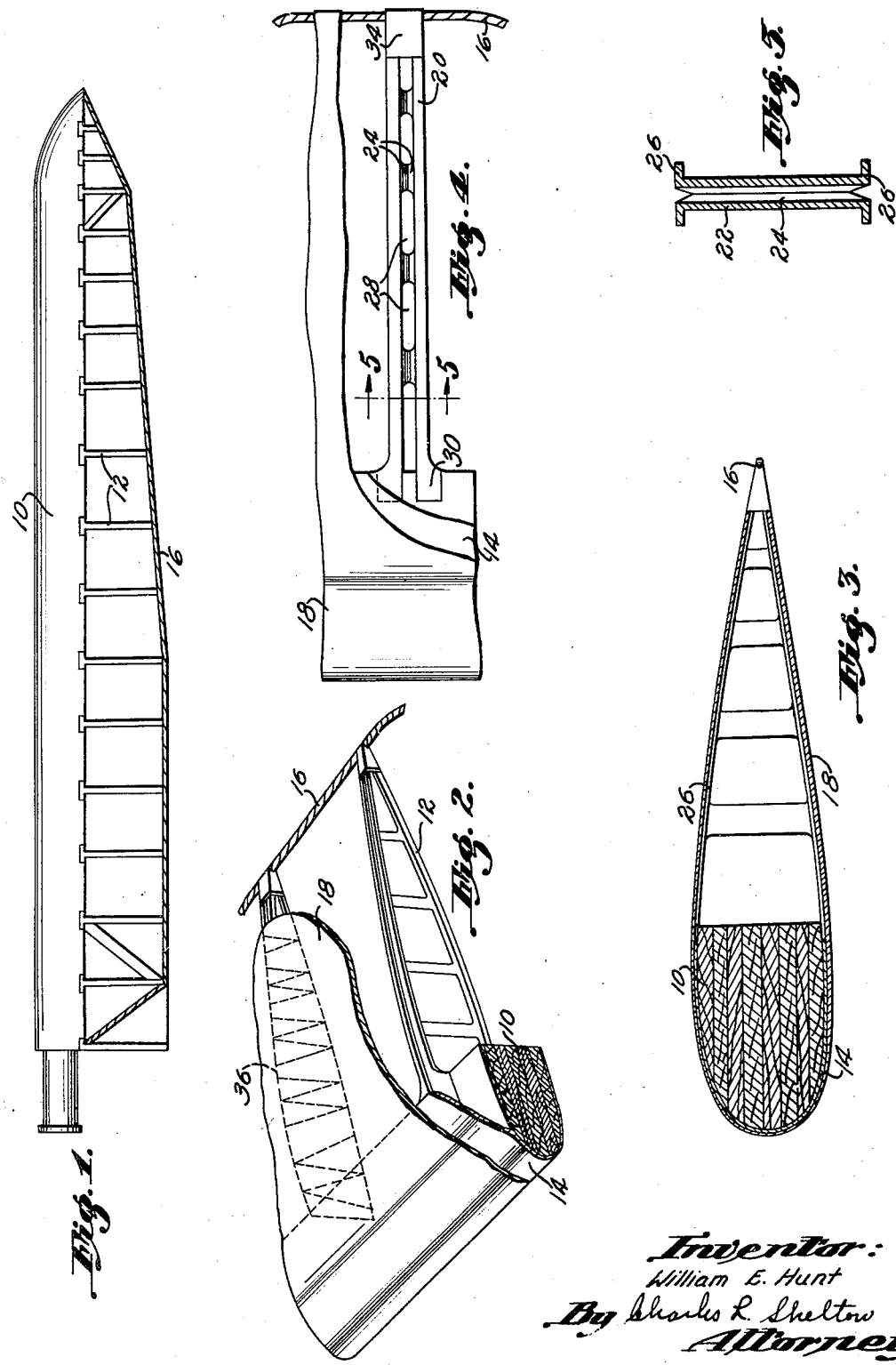
Inventor:
William E. Hunt
By Charles R. Shelton
Attorney Patented May 6, 1947

2,420,174

UNITED STATES PATENT OFFICE 2,420,174

ROTARY WING STRUCTURE

William E. Hunt, Milford, Conn., assignor to United Aircraft Corporation, East Hartford, Conn., a corporation of Delaware Application October 31, 1942, Serial No. 464,069

5 Claims. (Cl. 244—123)

This invention relates to a wing structure for aircraft, particularly to a wing or blade for a helicopter.

In helicopters, the rotating wing or blade preferably has a certain amount of flexibility in the plane of the blade. An object of this invention is to provide a wing structure capable of flexing wtihout injury to the wing or the wing surface.

A feature of the invention is a longitudinal spar for a wing which may be made up of thin plies of wood bonded together. Another feature is a rib made up of duplicate sections which are held in spaced relation to provide passages through which attaching means for the wing covering may extend.

Another feature is a longitudinal spar to which several rearwardly extending ribs are attached with the trailing edges of the ribs held in spaced relation by a cable. In this way as the wing is flexed, the cable will permit the trailing ends of the ribs to move toward each other.

Other objects and advantages will be apparent from the specification and claims, and from the accompanying drawings which illustrate what is now considered to be a preferred embodiment of the invention.

Fig. 1 is a plan view of the helicopter wing.

Fig. 2 is a perspective view with parts broken away showing the wing structure.

Fig. 3 is a sectional view through the wing.

Fig. 4 is a fragmentary plan view of the wing structure with the cover removed to show the rib.

Fig. 5 is a sectional view along the line 5—5 of Fig. 4.

The wing has a longitudinal spar 10 extending the length of the wing and ribs 12 extending from the spar to the trailing edge of the wing. The spar may be shaped to form the leading edge of the wing, as shown, and may be covered by a thin sheet of plywood 14. The spar may be made up of several thin strips of wood bonded together.

The trailing ends of the ribs are interconnected by a cable 16 fastened at its opposite ends to the ends of the longitudinal spar as shown in Fig. 1. Spar and ribs are covered by fabric 18.

Each rib is preferably made up of opposed sections 20, each formed from several thin sheets of wood bonded together by a plastic which may be one of the familiar resins commonly used in the bonding of wood plies.

Each section 20 is channel-shaped and comprises a web 22 with flanges 26 at top and bottom. Each web has a series of integral offsets 24 (Figs. 5, 6). The opposed sections 20 are placed with the offsets in engagement to define, as shown in Fig. 4, passages 28 extending vertically through the rib. The leading ends of flanges 26 of each rib are extended to form tongues 30 which enter recesses 32 in the upper and lower surfaces of the spar. These tongues are secured to the spar, and the plywood covering sheet 14 assists in holding them in position. The trailing edges of sheet 14 are preferably faired down in line with the edge of the longitudinal spar.

The trailing ends of the ribs may be connected to cable 16 by metal clips 34 bent around the cable and secured to the spar to prevent any relative movement between cable and spar.

In attaching fabric covering 18, the passages 28 in the ribs permit secure attachment of the fabric covering by means of connecting threads 36 (Fig. 2) extending between upper and lower surfaces of the wing and engaging the covering.

It is to be understood that the invention is not limited to the specific embodiment herein illustrated and described, but may be used in other ways without departure from its spirit as defined by the following claims.

I claim:

1. A rib for aircraft comprising, in combination; a pair of contralateral members, each having upper and lower flanges, webs connecting said flanges, offset surfaces on said webs for securing one member to the other; and means bonding said offset surfaces together; the offset surfaces providing aligned upper and lower slots between said edges of said flanges, and elongated vertical passages between the webs and the slots.

2. A rib for aircraft comprising, in combination; a pair of contralateral members, each having upper and lower flanges, webs connecting said flanges, offset surfaces on said webs for securing one member to the other; means bonding said surfaces of said webs together; the offset portions providing elongated open passages between said webs and increasing the ratio of effective solid area to weight of said rib; and flange extensions for mounting the rib.

3. A rib for aircraft comprising, in combination; a pair of contralateral members, each having upper and lower flanges, webs connecting said flanges, flat surfaced offset portions of said webs for securing the inside edge of said flanges away from a plane containing the surface of the portions; means bonding the surface of said portions together; the offset portions providing aligned upper and lower slots between said edges of said flanges, and elongated passages between the webs and the slots; and a clip secured to all of said flanges.

4. A rotor blade comprising, in combination, a laminated spar shaping the leading edge of the blade and having recesses at its rear edges, plywood ribs, each rib having a pair of contralateral webs with offset portions and flanges spaced by said portions to form a pair of open upper and lower slots between the flanges and elongated vertical passages between the webs, said flanges shaping the trailing portion of said blade, offset forward tips upon said flanges for fitting into said recesses to mount the ribs upon said spar, a leading edge cover overlying said spar and secured to the tips of said flanges substantially flush with the trailing portion of said flanges, a cable connected at its ends to inboard and outboard portions of said spar and intermediately to the tips of said ribs for forming the trailing edge of said blade, a blade covering overlying all of said parts, and stitching for said cover extending through said slots to opposite surfaces of said cover.

5. A rotor blade comprising, in combination, a spar forming the leading edge of the blade and having recesses at its rear edges, plywood ribs, each rib having webs turned outwardly to form contralateral flanges spaced to form a pair of open upper and lower slots in registry with elongated vertical openings, said flanges forming the trailing portion of said blade, the forward tips of said flanges fitting into said recesses, a leading edge cover overlying said spar and secured to the tips of said flanges substantially flush with the trailing portion of said flanges, clips at the tips of said ribs, a cable connected at its ends to the inboard and outboard portions of said spar and intermediately to said clips for forming the trailing edge of said blade, a blade covering overlying all of said parts, and stitching for said cover extending through said slots and openings to opposite surfaces of said cover.

WILLIAM E. HUNT.

REFERENCES CITED

The following references are of record in the file of this patent:

UNITED STATES PATENTS

| Number | Name | Date |
| --- | --- | --- |
| 1,891,681 | Messier | Dec. 20, 1932 |
| 1,949,785 | Cierva | Mar. 6, 1934 |
| 2,123,429 | Klemm | July 12, 1938 |
| 2,164,678 | Bennett | July 4, 1939 |
| 2,303,707 | Pullin | Dec. 1, 1942 |
| 998,978 | Norris | July 25, 1911 |
| 1,344,640 | Leinweber | June 29, 1920 |
| 1,789,240 | Leitner | Jan. 13, 1931 |
| 2,329,366 | Weill et al. | Sept. 14, 1943 |

FOREIGN PATENTS

| Number | Country | Date |
| --- | --- | --- |
| 737,063 | French | Sept. 27, 1932 |
| 387,904 | British | Feb. 16, 1933 |

OTHER REFERENCES

Civil Aeronautics Bulletin No. 27—Sept. 1940—page 66.

Airplane Mechanics Rigging Handbook—Hartz & Hall, published by Ronald Press Co., New York, 1930, page 50.

Civil Aeronautics Bulletin 27—Sept. 1940, entitled "Pilot's Airplane Manual," by N. O. Anderson, pages 60 to 65 (page 66 cited previously).